UNITED STATES PATENT OFFICE.

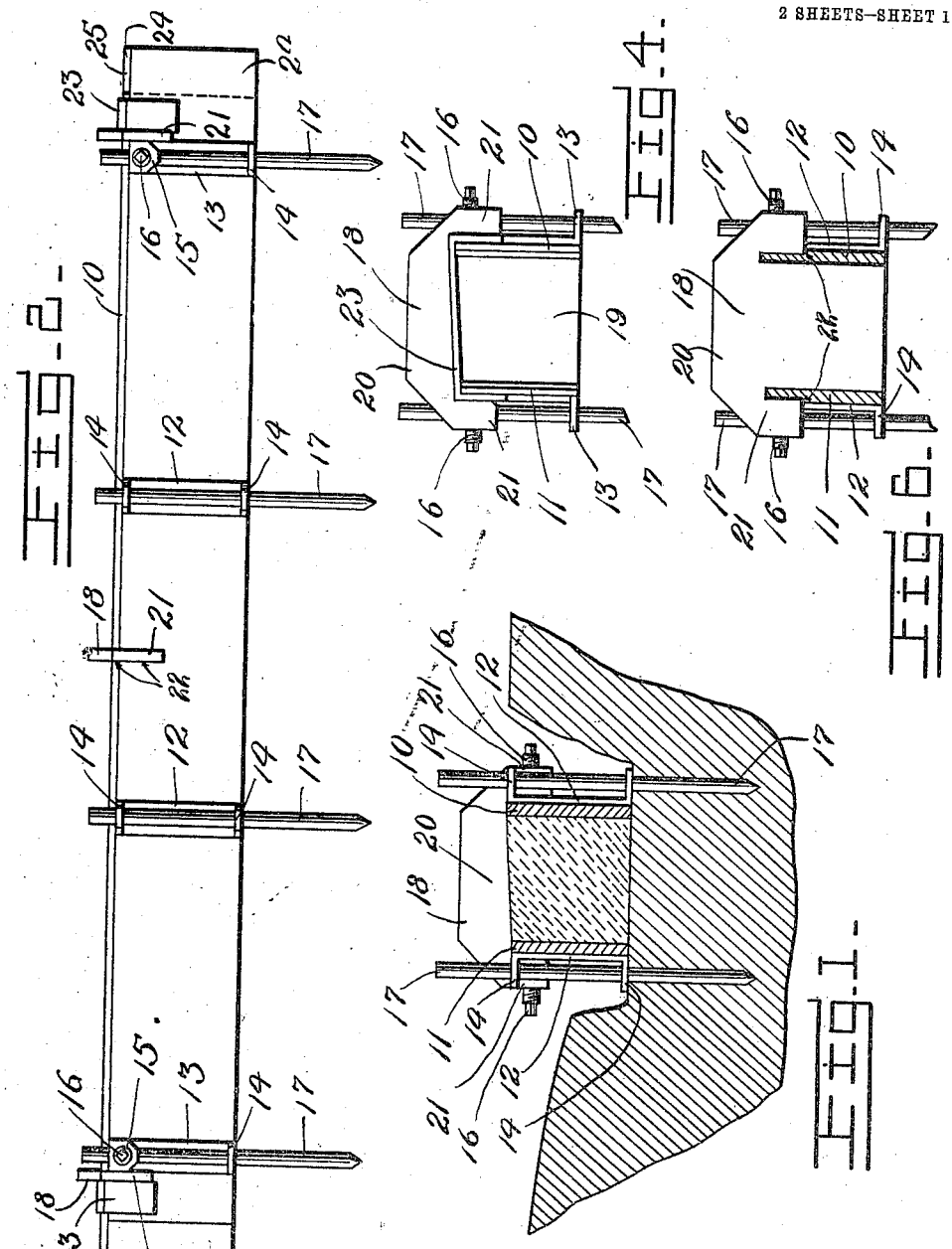

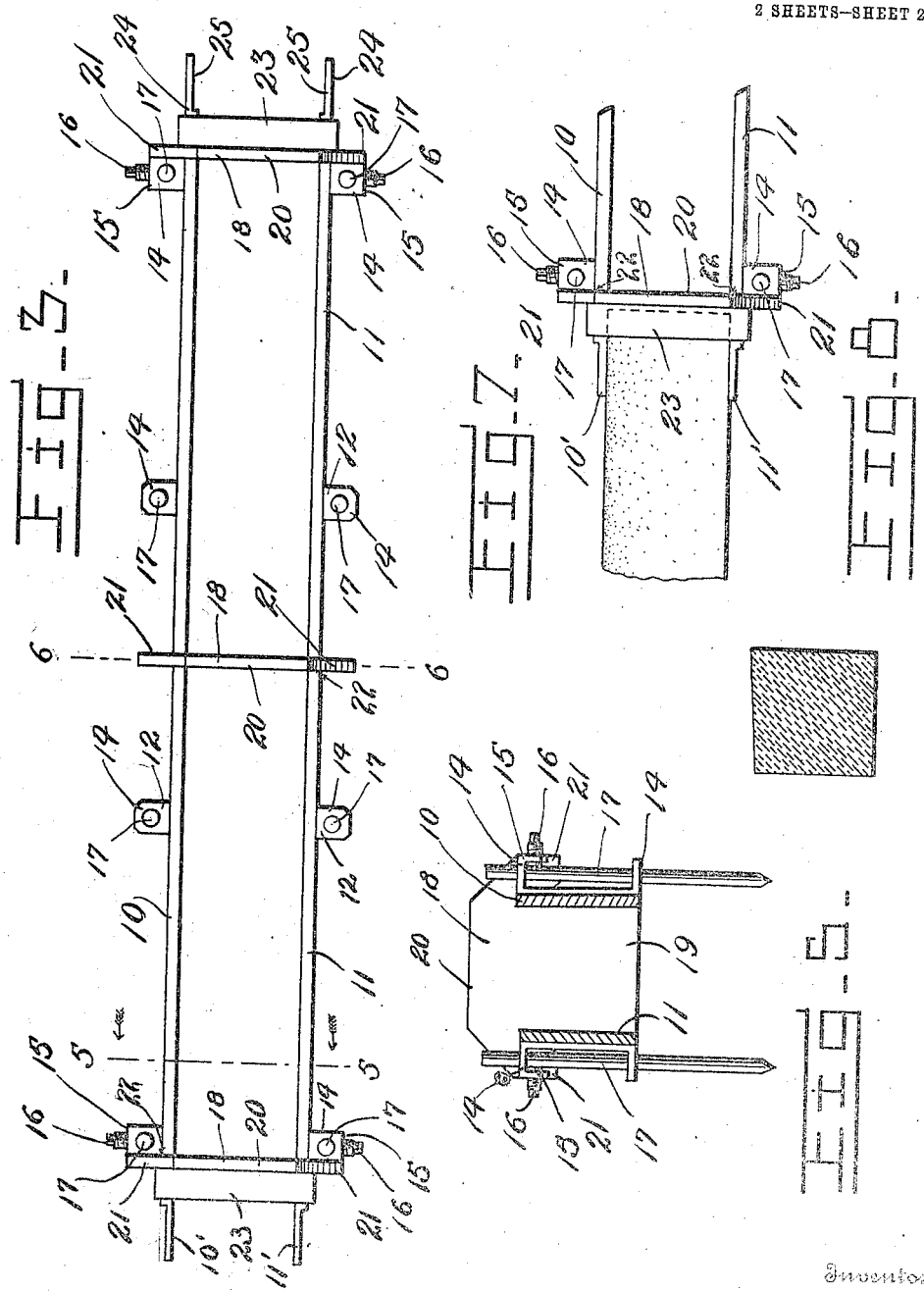

WALTER C. SIMPSON, OF PUNXSUTAWNEY, PENNSYLVANIA.

COLLAPSIBLE CONCRETE-FORM.

1,028,294.   Specification of Letters Patent.   Patented June 4, 1912.

Application filed June 22, 1911. Serial No. 634,781.

*To all whom it may concern:*

Be it known that I, WALTER C. SIMPSON, a citizen of the United States, residing at Punxsutawney, in the county of Jefferson and State of Pennsylvania, have invented certain new and useful Improvements in Collapsible Concrete-Forms, of which the following is a specification.

This invention relates to improvements in portable concrete molds, and has particular reference to a device of this character which is adapted to mold curb stones.

The principal object of the present invention is to provide a simple and efficient device of this character, by means of which curb stones may be molded in position along highways.

Another object is the provision of novel means for effecting the outward slant of the upper face of the stone for the purpose of drainage.

A still further object is to provide a novel construction of mold for this purpose, and means for holding the mold in position at the point where the stones are to be molded.

These and other objects will be apparent from the following description when taken in connection with the following specification and the accompanying drawings, but it will be understood that changes in the specific structure shown and described may be made within the scope of the claim without departing from the spirit of the invention.

In the drawings: Figure 1 is a sectional view of a portion of a roadway showing my device in use, the mold being shown in cross section, Fig. 2 is a side elevation of the mold, Fig. 3 is a top plan view, Fig. 4 is an end elevation, Fig. 5 is a transverse section on the line 5—5 of Fig. 3. Fig. 6 is a transverse section on the line 6—6 of Fig. 3, Fig. 7 is a top plan view of a portion of my mold in connection with a previously molded stone, Fig. 8 is a cross section of a stone molded with my device.

Referring particularly to the drawings, 10 and 11 represent the sides of my mold, which may be made of any suitable material as wood or metal, and of any suitable length. Secured on the outer face of each of the sides 10 and 11 are the plates 12 and 13, the plates 12 being bent outwardly at opposite ends as at 14, and formed with vertical openings. The plates 13 are formed similarly to the plates 12 except that one of the outturned portions 14 is formed with a downwardly extending portion 15 having a threaded opening for the reception of a set screw 16. The plates 12 and 13 are secured to the sides 10 and 11 in a vertical position, and stakes 17 are passed through the openings in the upper and lower of the outturned portions 14 and driven into the ground. There are 4 of these set screws represented in the drawing, two at each end of the mold, but if desired the plates 12 may be formed in the same manner as the plate 13 and have the set screws 16. These set screws are adapted to engage the stakes 17 to hold the mold in a rigid position, the stakes preventing moving sidewise, and the set screws preventing any vertical movement thereof.

The side 10 of the mold is of greater depth than the side 11 to provide for the formation of the proper incline to the upper face of the stone being molded.

To hold the sides of the mold in proper spaced relation I provide a series of plates 18, shown in detail in Fig. 6 which comprise the central tongue 19, the head 20 and the tongues 21, which latter are arranged at suitable distance from the tongue 19 on either side thereof. The distance between the lower end of the tongue 19 and the head is slightly greater on one side than it is on the other, so that when the plate is engaged on the sides of the mold as shown in Fig. 6 the deeper side will engage between the smaller tongue and the large tongue on the side of greater length, thus positioning the bottom of the tongue 19 on a level with the bottom edges of the sides 10 and 11. In the outer face of each of the sides 10 and 11 are formed the grooves 22 for the reception of the tongues 21 to insure their proper position.

From the foregoing it will be seen that in the use of the device the mold is set up at the proper place, when the stakes 17 are driven through the openings in the plates 12 and 13 and into the ground. The set screws 16 are then tightened to hold the mold in place. The dividing and spacing clamp plates are then positioned in proper relation on the sides 10 and 11, so that the mold will be divided into a number of parts to form several stones at once. When one section of the curbing has been molded the mold is removed and placed so that the portions 10' and 11' of the sides embrace the end of the finished section, a clamp 23 being placed over the ends to hold them in engagement therewith. In this manner the next succeeding section will be in perfect line with the already molded section. The opposite ends 24 of the sides 10 and 11 have the cutaway portions 25 which are adapted to receive the correspondingly shaped ends of additional sides, when it is intended to mold longer sections, at once, than the mold in use is capable of. In this instance one of the plates 18 will be placed over the interlocking mold, thus serving as a clamp to hold the sides of the mold together and to hold the ends of the adjoining molds.

While I have described the use of the device in connection with highways, it will be understood that the same may be used with equal effectiveness in towns or cities, the device being simple and cheap, and easily carried from one place to another.

What is claimed is:

A mold for artificial stone curbing comprising side members, said side members being of unequal depth whereby an inclined upper face is formed on the curb, plates secured to the outer faces of the side members, said plates being arranged vertically, outstanding apertured portions formed on said plates, certain of said plates having downturned threaded and apertured lips on one of said outstanding portions, stakes disposed through the apertured outstanding portions, said stakes adapted to be driven in the ground, set screws in the said downturned lips for engagement with certain of said stakes, and plates having a larger central tongue and shorter side tongues adapted to embrace the sides of the mold, said sides having grooves for the reception of said smaller tongues, the spaces between the smaller tongues and the larger tongues being of unequal lengths whereby the lower edge of the larger tongue will be level with the bottom of the mold.

In testimony whereof I affix my signature, in the presence of two witnesses.

WALTER C. SIMPSON.

Witnesses:
T. B. MITCHELL,
MINNIE KENNEY.